Patented Jan. 10, 1950

2,493,773

UNITED STATES PATENT OFFICE 2,493,773

HYDROPHENANTHRENE CARBOXYLIC ACIDS AND DERIVATIVES THEREOF AND PROCESS OF MAKING SAME

Karl Miescher, Riehen, and Georg Anner, Basel, Switzerland, assignors to Ciba Pharmaceutical Products, Inc., Summit, N. J.

No Drawing. Application July 23, 1948, Serial No. 40,434. In Switzerland August 27, 1947

5 Claims. (Cl. 260—515)

This invention relates to new hydrophenanthrene 2-carboxylic acids and derivatives thereof such as esters, nitrils and acid amides and their manufacture and more particularly those having the following ring skeleton

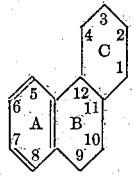

in which ring A is aromatic and rings B and C contains at most one additional double bond, position 7 is unsubstituted, and positions 1 and 2 are either unsubstituted or substituted by a hydrocarbon radical. Octahydrophenanthrene-2-carboxylic acids and derivatives are illustrative of the new compounds.

By the expression "hydrocarbon radical" in positions 1 and 2 is meant an alkyl radical such as methyl, ethyl, or propyl, an alkenyl radical such as alkyl, alkinyl radical such as ethinyl, or an aralkyl radical such as benzyl.

Such hydrophenanthrene-2-carboxylic acids and derivatives thereof are made by removing the substituent in the 7-position from a hydrophenanthrene-2-carboxylic acid, of which the ring A is aromatic and the ring structure contains at most one further double bond, and which contains in the 7-position a substituent capable of being eliminated and in the 1- and 2-positions hydrogen or hydrocarbon radicals.

The substituent in position 7 which is capable of being removed may be for example a hydroxyl or a hydroxyl the hydrogen of which has been substituted, an amino group or a halogen atom.

The removal of free hydroxyl groups or substituted hydroxyl groups, for example those esterified with aliphatic or aromatic acids such as acetic, propionic or benzoic acids, or those etherfied with aliphatic alcohols such as methanol or ethanol is carried out for example by reduction, especially catalytic hydrogenation in presence of a heavy metal catalyst and alkali or alkaline earth bases such as sodium, potassium or calcium hydroxides, under more or less elevated hydrogen pressure and temperature. In case the starting material has an additional double bond, especially in the 11, 12 position, this too can be saturated during the reduction. The elimination of an amino group is accomplished, for example by diazotization and heating while halogen atoms are removed by reduction.

Furthermore the hydrophenanthrene-2-carboxylic acids and their derivatives are obtained from 1-keto hydrophenanthrene-2-carboxylic acids and their derivatives in which ring A is aromatic, the 7 position is occupied by hydrogen and the 2-position is occupied by a hydrogen or a hydrocarbon radical and whose ring system contains at most one additional double bond by removing the keto group and if desired hydrogenating the ethylene double bond.

The removal of the keto group is accomplished for example by means of nascent hydrogen formed electrolytically or by biochemical methods or by catalytically activated hydrogen or through reaction with an organo-metallic compound. As organo-metallic compounds, organo-magnesium halides, alkyl or alkinyl alkali metal compounds and the like are employed. In the reaction with organo-metallic compounds a hydrocarbon radical, for example an alkyl radical such as methyl, ethyl or propyl or an alkenyl radical such as allyl, an alkinyl radical such as ethinyl or an aralkyl radical such as benzyl is introduced into the 1-position with the formation of a tertiary carbinol. From the resulting tertiary carbinol the newly formed tertiary hydroxyl group is then removed, after first, if necessary, reducing multiple bonds in the side chain.

A further modification of the process is carried out by cyclizing a 1-(3':4'-dihydronaphthyl-1')-butane which contains a free or functionally converted carboxyl group as well as a hydrogen of hydrocarbon radical in the 3-position, a hydroxyl or keto group as well as a hydrogen and/or hydrocarbon radical in the 4-position and a hydrogen in the 6'-position of the naphthyl radical, and if necessary hydrogenating the compounds thus obtained.

The butane side chain of the above mentioned starting material contains in the 3-position in addition to a free or functionally converted carboxyl group such as nitril, acid amide or especially ester group, a hydrogen or a hydrocarbon radical for example an alkyl radical, such as methyl, ethyl or propyl, an alkenyl radical such as alkyl or an aralkyl radical such as benzyl. If the side chain contains a hydroxyl in the 4-position, no double bond is formed in the cyclization. If however, a 4-oxo compound is used, a new double bond is formed during ring closure or subsequent dehydration of the primary condensation product. Such double bonds as well as others for example in unsaturated hydrocarbon radicals attached to the butane side chain or in the 11, 12 position of the phenanthrene ring are hydrogenated, if desired, after the ring closure.

As agents effective for ring closure there are used concentrated inorganic acids such as sulfuric, phosphoric or hydrofluoric acids or mixtures thereof, or also chlorides of phosphorus such as phosphorus oxychloride or oxide of phosphorus such as phosphorus pentoxide, alone or in presence of suitable solvents such as acetic acid, ether, or benzene.

In a further process for obtaining the desired hydrophenanthrene-2-carboxylic acids and their derivatives, 3:4 - dihydro - 1 - ethenyl or 3:4 - dihydro-1-ethinyl-naphthalene, which have a hydrogen in the 6-position are reacted with $\alpha:\beta$-unsaturated monocarboxylic acids or their derivatives and if the products thus obtained have two double bonds in rings B and C, at least one is hydrogenated.

As $\alpha:\beta$-unsaturated monocarboxylic acids one may use for example acrylic, methacrylic, crotonic, isocrotonic, angelic, tiglic, $\alpha:\gamma$-dimethylcrotonic, $\alpha$-methyl-$\beta$-vinyl-acrylic, propiolic and $\beta$-ethylpropiolic acids derivatives such as the nitril, acid amide and ester.

The diene synthesis may be carried out in the absence or presence of solvents, such as benzene, toluene, xylene, acetic, propionic or butyric acid at more or less elevated temperature and if desired in the presence of inert gases such as nitrogen.

Finally, the products are obtained also when 3:4 - dihydro - 1 - ethenyl - naphthalene which has a hydrogen in the 6-position is reacted with propiolic acid or its derivatives and, if the products obtained contain two double bonds in rings B and C, hydrogenating at least one.

The procedures employed in carrying out this diene synthesis with propiolic acid or its derivatives are analogous to those already described.

Functionally converted carboxyl groups, in compounds obtained according to the processes described are converted to free carboxyl group with hydrolytic agents.

Acids obtained according to the process may be esterified for example either directly with diazomethane or diazoethane or indirectly through the acid halides or salts, or converted to the carboxylic acid salts for example such as the alkali metal, alkaline earth metal or ammonium salts.

The products of the process are employed as therapeutic agents or as intermediates for their production, inasmuch as it has been found that the compounds have the surprising property of inhibiting the beginning of mitosis.

The invention is described in greater detail in the examples below, which it is to be understood are given by way of illustration and not limitation. In the examples the same relation exists between parts by weight and parts by volume as exists between grams and cubic centimeters; temperatures are given in degrees centigrade.

*Example 1*

Racemic 1 - ethyl - 2 - methyl - 1:2:3:4:9:10: 11:12 - octahydrophenanthrene - 2 - carboxylic acid:

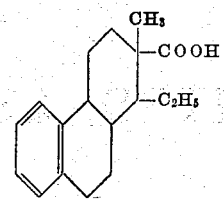

0.77 part by weight of racemic 7-methoxy-1-ethyl - 2 - methyl - 1:2:3:4:9:10: - hexahydrophenanthrene-2-carboxylic acid of melting point 168–170° C. is dissolved in 100 parts by volume of a 0.35% aqueous solution of caustic soda and heated to 80° C. for 4 hours in an autoclave under a pressure of 10 atmospheres of hydrogen in the presence of 2 parts by weight of a nickel catalyst. When cool, the contents of the autoclave are extracted with ether, and the alkaline solution is acidified, the acid precipitating in the form of an oil. This oil is then taken up in ether, and the ether evaporated after the washing and drying operations. After recrystallization from methanol the racemic 1 - ethyl - 2 - methyl - 1:2:3:4:9:10:11:12 - octahydrophenanthrene - 2 - carboxylic acid is obtained which melts at 176–178° C.

When there are used as starting materials 7-alkoxy-1:2:3:4:9:10-hexahydrophenanthrene-2-carboxylic acids which only in the 1- or 2-position contain a hydrocarbon radical, such as an alkyl group, the product is a corresponding 1:2:3:4:9: 10:11:12-octahydrophenanthrene - 2 - carboxylic acid with a hydrocarbon radical in the 1- or 2-position only.

*Example 2*

Dextro-rotary 1-ethyl-2-methyl-1:2:3:4:9:10: 11:12 - octahydrophenanthrene - 2 - carboxylic acid:

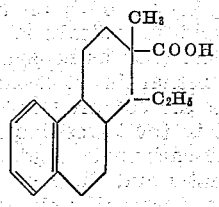

0.4 part by weight of methyl ether of the natural (+) doisynolic acid [(+) 7-methoxy-1-ethyl-2-methyl - 1:2:3:4:9:10:11:12 - octahydrophenanthrene-2-carboxylic acid] from estrone is dissolved in 100 parts by volume of dilute caustic soda solution and hydrogenated at 80° C. under 15 atmospheres of hydrogen pressure after the addition of 2 parts by weight of a nickel catalyst. After the completion of the hydrogenation, the alkaline solution is extracted with ether and then acidified with dilute hydrochloric acid, the hydrogenation product separating in the form of an oil. Through the recrystallization of the latter from methanol, the dextro-rotary 1- ethyl-2-methyl - 1:2:3:4:9:10:11:12 - octahydrophenanthrene-2-carboxylic acid is obtained which melts at 145–146° C. and has the specific rotation $[\alpha]_D^{22} = +97°$ (in alcohol).

Example 3

Racemic 1:2-dimethyl-1:2:3:4:9:10-hexahydrophenanthrene-2-carboxylic acid:

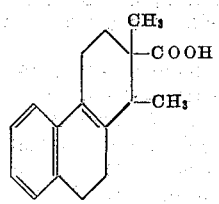

To a Grignard solution prepared from 1 part by weight of magnesium in 80 parts by volume of ether and 10 parts by volume of methyliodide there are added in a single addition 8 parts by weight of 1-oxo-2-methyl-1:2:3:4:9:10-hexahydrophenanthrene-2-carboxylic acid methyl ester. The reaction mass is then heated and, when it has cooled down, decomposed with ice-cold ammonium chloride solution. The reaction product is taken up in a large quantity of ether, washed with dilute hydrochloric acid and water, and the ethereal solution is evaporated. From the residue there is obtained 1-oxy-1:2-dimethyl-1:2:3:4:9:10-hexahydrophenanthrene-2-carboxylic acid methyl ester and 1-methylene-2-methyl-1:2:3:4:9:10-hexahydrophenanthrene - 2 - carboxylic acid methyl ester. The latter compound is catalytically hydrogenated, the hydrogenation practically coming to a standstill when the double bond of the methylene group is saturated. 1 part by weight of the thus obtained 1:2-dimethyl-1:2:3:4:9:10-hexahydrophenanthrene - 2 - carboxylic acid methyl ester is then heated in an open vessel to 170–180° C. together with a mixture of 3 parts by weight of potassimum hydroxide and 10 parts by volume of alcohol in order to hydrolyze the carbomethoxy group. The free 1:2-dimethyl-1:2:3:4:9:10-hexahydrophenanthrene-2 - carboxylic acid is thus obtained.

By reducing the double bond in the 11:12-position of the 1:2-dimethyl-1:2:3:4:9:10-hexahydrophenanthrene-2-carboxylic acid methyl ester, for example by means of metallic sodium and alcohol in liquid ammonia and subsequent hydrolysis of the carbomethoxy group the corresponding 1:2-dimethyl-1:2:3:4:9:10:11:12-octahydrophenanthrene-2-carboxylic acid is obtained. The same end product can be made by using, in lieu of the starting material used in this example, 1-oxo - 2 - methyl-1:2:3:4:9:10:11:12-octahydrophenanthrene-2-carboxylic acid methyl ester.

Example 4

Racemic 1-ethyl-2-methyl-1:2:3:4.9:10-hexahydrophenanthrene-2-carboxylic acid:

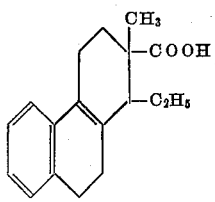

5 parts by weight of 6-(3':4'-dihydronaphthyl-1')-4-methyl-4-carbomethoxy-hexane-3-one are mixed at 0° C. with 150 parts by volume of ice-cold concentrated sulfuric acid and stirred at this temperature until dissolution is complete. When the cyclization is finished, the reaction mixture is poured onto ice and the precipitated oily product is taken up in ether. The ethereal solution is washed neutral and dried and then evaporated to obtain the 1-ethylidene-2-methyl-1:2:3:4:9:10 - hexahydrophenanthrene - 2 - carboxylic acid methyl ester. This compound is converted into the 1-ethyl-2-methyl-1:2:3:4:9:10-hexahydrophenanthrene - 2 - carboxylic acid methyl ester by hydrogenation in the presence of a nickel catalyst. In order to hydrolyze the carbomethoxy group 1 part by weight thereof is heated in an open vessel to 170–180° C. in a mixture of 3 parts by weight of potassium hydroxide, 0.5 part by weight of water and 5 parts by volume of alcohol. The reaction mixture is then dissolved in water, and acidified with dilute hydrochloric acid to obtain 1-ethyl-2-methyl-1:2:3:4:9:10 - hexahydrophenanthrene - 2 - carboxylic acid.

In lieu of performing direct cyclization, one may first reduce the starting material, for example with catalytically activated or nascent hydrogen or with an aluminum alcoholate or aluminum phenolate in the presence of isopropyl alcohol, to obtain 6 - (3':4' - dihydronaphthyl - 1')-4-methyl-4-carbomethoxy-hexane-3-ol, and then treat this compound with a cyclicizing agent. The primary conversion into a carbinol may alternatively be performed by the reaction with an organo-metal compound, whereby the >C=O group in 3-position is converted into the

group wherein R stands, for example, for an alkyl, aralkyl or aryl group.

The starting material can be obtained, for example, as follows: A mixture of 15 parts by weight of finely pulverized potassium in 500 parts by volume of benzene is mixed with 74 parts by weight of α-propionyl-propionic acid methyl ester and heated under an atmosphere of nitrogen until a clear solution is obtained. There are then added to the cooled solution 120 parts by weight of 1-(β-bromethyl)-3:4-dihydronaphthalene whereupon it is refluxed for several hours. When it has cooled off, it is acidified with glacial acetic acid, extracted with ether, washed neutral, dried and evaporated. The resultant 6-(3':4'-dihydronaphthyl - 1') - 4 - methyl - 4 - carbomethoxy-hexane-3-one can be distilled in a high vacuum without being decomposed.

Example 5

1:2:3:4:9:10:11:12 - octahydrophenanthrene - 2-carboxylic acid:

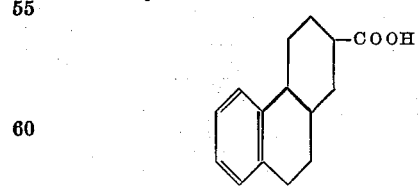

10 parts by weight of 1-ethenyl-3:4-dihydronaphthalene are boiled overnight in a Claisen flask with 10 parts by weight of propiolic acid methyl ester in an atmosphere of nitrogen. From the reaction mixture, the unchanged starting materials and then also the newly formed tetrahydrophenanthrene - 2 - carboxylic acid methyl ester are distilled off. In order to saturate the two newly formed double bonds in ring C of the latter compound with hydrogen, 2 parts by weight thereof are hydrogenated in the presence of 1 part by weight of a palladium catalyst and 50 parts by volume of glacial acetic acid.

The crude hydrogenation product is heated in an open vessel to about 160° C. with a mixture of 3 parts by weight of potassium hydroxide and 10 parts by volume of alcohol. The cooled melt is dissolved in water and the alkaline solution is acidified with a dilute solution of hydrochloric acid, whereupon the 1:2:3:4:9:10:11:12-octahydrophenanthrene-2-carboxylic acid precipitates.

*Example 6*

1:2:3:4:9:10:11:12 - octahydrophenanthrene - 2-carboxylic acid:

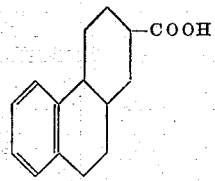

20 parts by weight of 1-ethenyl-3:4-dihydronaphthalene are added at 0° C. to 100 parts by volume of hydrogen bromide in ether, 40 parts by weight of acrylic acid are carefully added and the mixture is allowed to stand at room temperature for some time, while the newly formed hexahydrophenanthrene-2-carboxylic acid precipitates. 1 part by weight thereof is dissolved in 50 parts by volume of glacial acetic acid and agitated in the presence of 1 part by weight of a palladium catalyst under hydrogen. The hydrogenation ceases when the quantity of hydrogen calculated for 1 molecular equivalent is absorbed. 1:2:3:4:9:10:11:12 - octahydrophenanthrene-2-carboxylic acid is obtained when the catalyst is removed by filtration and the solvent evaporated.

What we claim is:

1. A hydrophenanthrene-2-carboxylic acid in which ring A is aromatic, and positions 1 and 2 are occupied by a member of the group consisting of hydrogen and lower alkyl and in which the ring skeleton contains at most one additional double bond and no further substituents.

2. A 1:2:3:4:9:10:11:12 - octahydrophenanthrene-2-carboxylic acid in which positions 1 and 2 are occupied by a member of the group consisting of hydrogen and lower alkyl and in which the ring skeleton contains no further substituents.

3. A 1-ethyl-2-methyl-1:2:3:4:9:10:11:12-octahydrophenanthrene -2-carboxylic acid.

4. The process of preparing hydrophenanthrene-2-carboxylic acids in which ring A is aromatic, and positions 1 and 2 are occupied by a member of the group consisting of hydrogen and lower alkyl and in which the ring skeleton contains at most one additional double bond and no further substituent, which comprises reacting hydrophenanthrene-2-carboxylic acids and their derivatives in which ring A is aromatic, position 7 is occupied by an etherified hydroxyl and positions 1 and 2 are occupied by a member of the group consisting of hydrogen and lower alkyl with hydrogen over a hydrogenation catalyst at a temperature of about 80° C. and a pressure of about 15 atmospheres.

5. The process of preparing 1-ethyl-2-methyl-1:2:3:4:9:10:11:12 - octahydrophenanthrene - 2-carboxylic acid which comprises reacting 7-methoxy-1-ethyl-2-methyl-1:2:3:4:9:10-hexahydrophenanthrene-2-carboxylic acid with hydrogen and a hydrogenation catalyst at a temperature of about 80° C. and a pressure of about 15 atmospheres.

KARL MIESCHER.
GEORG ANNER.

REFERENCES CITED

The following references are of record in the file of this patent:

Heer et al., Helv. Chim. Acta., vol. 28, p. 1516 (1945).

Bhattacharyya, Chem. Abstracts, vol. 40, Col. 5044 (1946).

Haworth et al., J. Chem. Soc., vol. 1946, pp. 633–636.